United States Patent [19]

Nishida et al.

[11] Patent Number: 5,296,421
[45] Date of Patent: Mar. 22, 1994

[54] METHOD FOR PRODUCING ZIRCONIA-BASED SINTERED BODY

[75] Inventors: Yasunori Nishida; Masahide Mohri, both of Tsukuba, Japan

[73] Assignee: Sumitomo Chemical Company, Limited, Osaka, Japan

[21] Appl. No.: 991,946

[22] Filed: Dec. 17, 1992

[30] Foreign Application Priority Data

Dec. 25, 1991 [JP] Japan .................. 3-343122

[51] Int. Cl.$^5$ ............................. C04B 35/48
[52] U.S. Cl. ............................. 501/105; 501/104
[58] Field of Search ................. 501/104, 105

[56] References Cited

U.S. PATENT DOCUMENTS 4,666,467  5/1987  Matsumoto et al. ............... 51/309
5,164,348  11/1992  Dood ..................................... 501/127

OTHER PUBLICATIONS

*Advances in Ceramics*, vol. 12, Science and Technology of Zirconia II, pp. 528–536 (1984), F. J. Esper et al., "Mechanical, Thermal, and Electrical Properties in the System of Stabilized $ZrO_2(Y_2O_3)/a$-$Al_2O_3$".

*Primary Examiner*—Karl Group
*Assistant Examiner*—Chris Gallo
*Attorney, Agent, or Firm*—Stevens, Davis, Miller & Mosher

[57] ABSTRACT

A sintered body where alumina is dispersed in a zirconia matrix in which yttria has been doped to form a solid solution can be obtained by compacting a mixed powder comprising zirconia or yttria-stabilized zirconia and yttrium-aluminum complex oxide and sintering the resulting compacted body. This sintered body comprises a fine zirconia matrix in which fine alumina particles are dispersed to strengthen it and is excellent in flexural strength and fracture toughness and has a practically effective oxygen ionic conductivity.

5 Claims, No Drawings

METHOD FOR PRODUCING ZIRCONIA-BASED SINTERED BODY

BACKGROUND OF THE INVENTION

1. Field of the Invention

The present invention relates to a method for producing a zirconia-based sintered body excellent in mechanical properties and having practically effective oxygen ionic conductivity.

2. Description of the Related Art

Cubic zirconia stabilized with yttria has an excellent oxygen ionic conductivity at high temperatures and has been noticed as functional ceramics such as solid electrolytes for fuel cells and oxygen sensors. However, since the stabilized cubic zirconia is mechanically very brittle, it lacks reliability in practical use and besides is difficult to form into large or thin products.

On the other hand, stabilized tetragonal zirconia is a sintered body obtained by stabilizing at room temperature the tetragonal crystal phase stable at high temperatures and is excellent in strength and toughness at room temperature. This is because when the stabilized tetragonal zirconia undergoes stress resulting in cracks, phase transformation of the tetragonal crystal to monoclinic crystal is brought about by the stress field at the head of the cracks and growth of the cracks is inhibited due to volume expansion caused by the phase transformation. However, since the tetragonal crystal becomes stable at high temperatures, the transformation to monoclinic crystal occurs with difficulty and mechanical properties greatly deteriorate.

Furthermore, oxygen ionic conductivity of the stabilized tetragonal zirconia is inferior to that of the stabilized cubic zirconia. Therefore, in order that zirconia can be practically used as an oxygen ionic conductor, strength and toughness of the cubic zirconia must be enhanced. There have been studied some methods for enhancing the toughness of ceramics and one effective method is the particle-dispersion-strengthening method. This method attains the strenghening by dispersing second phase particles in a matrix and the most important is that the particles to be dispersed are finely and uniformly dispersed.

Improvement of mechanical properties by the particle-dispersion-strengthening method with addition of alumina to zirconia has been practised for tetragonal zirconia. For example, T. Shimada et al ["Advances in Ceramics", Vol. 24, Page 397 (1988)] have produced a composite by mill-mixing alumina with tetragonal zirconia in which 2-3 mol % of $Y_2O_3$ is doped to form a solid solution. As a result, a flexural strength of about 1000 MPa and a fracture toughness ($K_{1c}$) of 5-6 MPam$^{\frac{1}{2}}$ were obtained by adding alumina in an amount of 10-20% by weight. Furthermore, K. Tsukuma et al have reported that the strength can be improved to 2400 MPa by the hot isostatic pressing (HIP) ["J. of American Ceram. Soc.", Vol. 68, C-4 (1985)]. However, these are tetragonal zirconias and hence are unsuitable as oxygen ionic conductors. With reference to cubic zirconia, too, E. J. Esper et al have reported that strengthening can be attained by mill-mixing under vibration alumina with cubic zirconia in which 7.5 mol % of $Y_2O_3$ is doped to form a solid solution ["Advances in Ceramics", Vol. 12, Page 528 (1984)]. However, in this case, the particle size of zirconia in the sintered body is large, namely, 1-5 μm and besides, dispersion of alumina is ununiform.

According to these methods, zirconia powders and alumina powders are merely mechanically mixed and sintered and the products are inferior in uniformity of dispersion of the particles in the matrix of sintered body and are also unsatisfactory as oxygen ionic conductors. Thus, the object of the present invention is to provide a method for producing a zirconia-based sintered body in which alumina particles are uniformly dispersed and which is excellent in mechanical properties and has practically effective oxygen ionic conductivity.

SUMMARY OF THE INVENTION

The present invention relates to a method for producing a zirconia-based sintered body comprising a zirconia matrix in which yttria is doped to form a solid solution and in which alumina is dispersed, characterized by compacting mixed powders comprising zirconia or yttria-stabilized zirconia and a yttrium-aluminum complex oxide and sintering the compacted product.

DESCRIPTION OF PREFERRED EMBODIMENTS

The feature of the present invention resides in producing a ceramic which is particle-dispersion-strengthened by dispersing alumina in a zirconia matrix in which yttria has been doped to form a solid solution, by allowing a solid phase reaction to take place between zirconia and yttrium-aluminum complex oxide which are starting material powders in the sintering step.

In the present invention, the zirconia powders as a starting material have no special limitation and any zirconia powders can be used as far as 0-8 mol % of yttria is doped therein to form a solid solution.

The particle size of zirconia or yttrium-aluminum complex oxide which are starting material powders is preferably in the range of 0.1-1.0 μm. The particle size of alumina is preferably in the range of 0.1-1.0 μm.

Methods of grinding, drying and mixing have no special limitations and known methods can be employed.

It is necessary to carry out the sintering at a temperature within the range where a solid phase reaction takes place and the range of 1100°-1600° C. is preferred in the present invention.

The content of the yttrium-aluminum complex oxide in the mixed powders comprising zirconia or yttria-stabilized zirconia and the yttrium-aluminum complex oxide is 5-50% by weight, preferably 10-30% by weight. When the content is less than 5% by weight, the effect of particle-dispersion-strengthening cannot be attained by the solid phase reaction and when it is more than 50% by weight, the oxygen ionic conductivity greatly decreases.

The yttrium-aluminum complex oxides include, for example, yttrium aluminum garnet ($Y_3Al_5O_{12}$) [hereinafter referred to as "YAG"], $YAlO_3$ and $Y_4Al_2O_9$. YAG is preferred considering the stability at higher than 1000° C.

Methods of Measurement

Properties of the sintered body were measured by the following apparatuses and methods.

[Particle size of powders]: This was measured in accordance with particle size analysis using laser diffraction by SALD-1100 manufactured by Shimadzu Seisakusho Ltd.

[Flexural strength]: This was measured by three-point flexural test method in accordance with JIS R1601.

[Oxygen ionic conductivity]: A platinum electrode was coated on the cylindrical sample (10 mm diameter × 3 mm) and the conductivity was measured by complex impedance plot method using 4192A manufactured by Hurret Packard Co.

[Specific surface area]: This was measured by BET method using Flowsorb 11-2300 manufactured by Micromeritics Co.

[Fracture toughness ($K_{1c}$)]: This was measured by IF method and calculated by the Niihara's formula ["J. of Material Sci. Lett.", Vol. 1, Page 13 (1982)].

[Grain size of zirconia]: This was obtained by image analysis processing of SEM image.

[Crystal phase of zirconia]: This was obtained by calculation using the calculation formulas (1) and (2) mentioned in "Advances in Ceramics", Vol. 3, Page 247 (1984) from integrated intensities of X-ray diffraction which were obtained using X-ray diffraction apparatus RAD-2C manufactured by Rigaku Denki Co.

EXAMPLE 1

680 ml of an aqueous yttrium acetate solution (concentration 15.8% by weight) was added dropwise to 670 ml of a solution of aluminum isopropoxide in isopropyl alcohol (concentration 20.6% by weight) to obtain a hydrolyzate slurry. This slurry was dried and then heat treated at 1200° C. for 4 hours to obtain YAG powders which comprised yttrium-aluminum complex oxide. The resulting YAG powders were subjected grinding treatment for 30 minutes by a vibration mill and for 15 hours by a ball mill. The YAG powders after subjected to the grinding treatments had a BET specific surface area of 18 m$^2$/g and a mean particle size of 0.25 µm.

17.8 g of the resulting YAG powders and 82.2 g of zirconia powders [TZ-0 (ZrO$_2$ contained no Y$_2$O$_3$) having a mean particle size of 0.28 µm manufactured by Toso Co., Ltd.] were crushed and mixed for 6 hours by a wet ball milling and then dried to obtain mixed powders (having a center diameter of 0.25 µm). 3 g of the resulting mixed powders were subjected to uniaxial die pressing under 300 kg/cm$^2$ and then a compacted body was made therefrom by cold isostatic press (CIP) under 1.5 ton/cm$^2$ and was sintered at 1450° C. for 30 minutes. The mixing ratio of the starting material powders is shown in Table 1 and the properties of the resulting sintered body are shown in Tables 2 and 3.

EXAMPLE 2

A sintered body was obtained in the same manner as in Example 1 except that 11.6 g of the YAG powders obtained in Example 1 and 88.4 g of yttria-stabilized zirconia powders [TZ-3Y (3 mol % of Y$_2$O$_3$ was doped in ZrO$_2$ to form a solid solution) having a mean particle size of 0.30 µm manufactured by Toso Co., Ltd.] were used. The mixing ratio of the starting material powders and the properties of the resulting sintered body are shown in Tables 1, 2 and 3.

EXAMPLE 3

A sintered body was obtained in the same manner as in Example 1 except that 17.7 g of the YAG powders obtained in Example 1 and 45.2 g of zirconia powders [TZ-0 (ZrO$_2$ contained no Y$_2$O$_3$) manufactured by Toso Co., Ltd.] were used. The mixing ratio of the starting material powders and the properties of the resulting sintered body are shown in Tables 1, 2 and 3.

EXAMPLE 4

A sintered body was obtained in the same manner as in Example 1 except that 11.5 g of the YAG powders obtained in Example 1 and 49.4 g of yttria-stabilized zirconia powders [TZ-3Y (3 mol % of Y$_2$O$_3$ was doped in ZrO$_2$ to form a solid solution) manufactured by Toso Co., Ltd.] were used. The mixing ratio of the starting material powders and the properties of the resulting sintered body are shown in Tables 1, 2 and 3.

EXAMPLE 5

A sintered body was obtained in the same manner as in Example 1 except that 26.4 g of the YAG powders obtained in Example 1 and 73.6 g of zirconia powders [TZ-0 manufactured by Toso Co., Ltd.] were used. The mixing ratio of the starting material powders and the properties of the resulting sintered body are shown in Tables 1, 2 and 3.

COMPARATIVE EXAMPLE 1

Only yttria-stabilized zirconia powders [TZ-8Y (8 mol % of Y$_2$O$_3$ was doped in ZrO$_2$ to form a solid solution) having a mean particle size of 0.30 µm manufactured by Toso Co., Ltd] in an amount of 3 g were subjected to uniaxial die pressing under 300 kg/cm$^2$ and a compacted body was made therefrom by CIP under 1.5 ton/cm$^2$ and sintered at 1450° C. for 30 minutes. The mixing ratio of the starting material powders and the properties of the resulting sintered body are shown in Tables 1, 2 and 3.

COMPARATIVE EXAMPLE 2

4.4 g of alumina powders (AKP-50 manufactured by Sumitomo Chemical Co., Ltd. and having a mean particle size of 3.0 µm) and 45.7 g of yttria-stabilized zirconia powders [TZ-8Y (8 mol % of Y$_2$O$_3$ was doped in ZrO$_2$ to form a solid solution) manufactured by Toso Co., Ltd.] were crushed and mixed for 6 hours by a wet ball mill and then dried to obtain mixed powders (having a mean particle size of 0.25 µm). 3 g of the resulting mixed powders were subjected to uniaxial die pressing under 300 kg/cm$^2$ and then a compacted body was made therefrom by CIP under 1.5 ton/cm$^2$ and was sintered at 1450° C. for 30 minutes. The mixing ratio of the starting material powders and the properties of the resulting sintered body are shown in Tables 1, 2 and 3.

TABLE 1

| | Mixing ratio of starting material powders (% by weight) | | |
|---|---|---|---|
| | YAG powder | Zirconia powder | Alumina powder |
| Example 1 | 17.8 | 82.2 | 0 |
| 2 | 11.6 | 88.4 | 0 |
| 3 | 28.1 | 71.9 | 0 |
| 4 | 18.9 | 81.1 | 0 |
| 5 | 26.4 | 73.6 | 0 |
| Comparative Example 1 | 0 | 100.0 | 0 |
| 2 | 0 | 91.3 | 8.7 |

TABLE 2

| | Flexural strength of sintered body (kg/mm$^2$) | Fracture toughness: $K_{1c}$ (MPam$^{\frac{1}{2}}$) |
|---|---|---|
| Example 1 | 51.5 | 4.1 |

TABLE 2-continued

|  | Flexural strength of sintered body (kg/mm$^2$) | Fracture toughness: K$_{1c}$ (MPam$^{\frac{1}{2}}$) |
|---|---|---|
| 2 | 46.5 | 3.4 |
| 3 | 37.9 | 3.0 |
| 4 | 35.1 | 3.0 |
| 5 | 35.1 | 3.0 |
| Comparative Example 1 | 23.2 | 2.6 |
| 2 | 29.2 | 2.8 |

TABLE 3

| | Grain size of zirconia in sintered body (μm) | Crystal phase of zirconia (%) | | Conductivity (S/cm) | |
|---|---|---|---|---|---|
| | | Tetragonal system | Cubic system | 950° C. | 400° C. |
| Example | | | | | |
| 1 | 0.19 | 27 | 73 | 0.055 | 0.67 × 10$^{-4}$ |
| 2 | 0.28 | 0 | 100 | 0.075 | 1.05 × 10$^{-4}$ |
| 3 | 0.28 | 0 | 100 | 0.076 | 0.72 × 10$^{-4}$ |
| 4 | 0.31 | 0 | 100 | 0.087 | 0.89 × 10$^{-4}$ |
| 5 | 0.35 | 5 | 95 | 0.107 | 0.94 × 10$^{-4}$ |
| Comparative Example | | | | | |
| 1 | 1.09 | 0 | 100 | 0.117 | 1.77 × 10$^{-4}$ |
| 2 | 0.49 | 0 | 100 | 0.089 | 1.01 × 10$^{-4}$ |

What is claimed is:

1. A method for producing a zirconia-based sintered body comprising a zirconia matrix containing yttria doped therein to form a solid solution and alumina dispersed in said zirconia matrix which comprises compacting a mixed powder comprising zirconia or yttria-stabilized zirconia and yttrium-aluminum complex oxide and sintering the resulting compacted body.

2. A method according to claim 1, wherein the mixed powder comprising zirconia or yttria-stabilized zirconia and yttrium-aluminum complex oxide contains 5–50% by weight of the yttrium-aluminum complex oxide.

3. A method according to claim 1, wherein the mixed powder comprising zirconia or yttria-stabilized zirconia and yttrium-aluminum complex oxide contains 10–30% by weight of the yttrium-aluminum complex oxide.

4. A method according to claim 1, wherein particle size of the zirconia, the yttria-stabilized zirconia and the yttrium-aluminum complex oxide is 0.1–1.0 μm.

5. A method according to claim 1, wherein the yttrium-aluminum complex oxide is yttrium aluminum garnet ($Y_3Al_5O_{12}$)

* * * * *